US012688351B1

(12) United States Patent
Sonawane et al.

(10) Patent No.: US 12,688,351 B1
(45) Date of Patent: Jul. 21, 2026

(54) ROTATING USER INTERFACE ELEMENT DETECTION

(71) Applicant: BrowserStack Limited, Dublin (IE)

(72) Inventors: Suyash Yogeshwar Sonawane, Nashik (IN); Jimesh Mayank Chokshi, Mumbai (IN)

(73) Assignee: BrowserStack Limited, Dublin (IE)

( * ) Notice: Subject to any disclaimer, the term of this patent is extended or adjusted under 35 U.S.C. 154(b) by 0 days.

(21) Appl. No.: 19/332,363

(22) Filed: Sep. 18, 2025

(51) Int. Cl.
    *G06F 40/117*     (2020.01)
    *G06F 16/957*     (2019.01)
    *G06F 40/279*     (2020.01)

(52) U.S. Cl.
    CPC ........ *G06F 40/117* (2020.01); *G06F 16/9577* (2019.01); *G06F 40/279* (2020.01)

(58) Field of Classification Search
    CPC ... G06F 40/117; G06F 16/9577; G06F 40/279
    See application file for complete search history.

(56) References Cited

U.S. PATENT DOCUMENTS 11,416,917 B2 *  8/2022  Jose .................... G06F 3/04817
2010/0205523 A1 *  8/2010  Lehota ................ G06F 16/9577
    715/765

2013/0212524 A1 *  8/2013  Nurse ................... G06F 40/166
    715/788
2016/0012147 A1 *  1/2016  Benjamin ............. G06F 16/957
    715/234
2016/0291846 A1 *  10/2016  DeWeese .................. G06T 1/20

OTHER PUBLICATIONS

Akpınar, M.E., Yeilada, Y. et al. (2013). Heuristic Role Detection of Visual Elements of Web Pages (Year: 2013).*

* cited by examiner

*Primary Examiner* — Cao H Nguyen
(74) *Attorney, Agent, or Firm* — Cognition IP, P.C.; Edward Steakley; Saleh Kaihani

(57)     ABSTRACT

An accessibility test engine can receive the document object model of a webpage and analyze the webpage for compliance with a set of accessibility rules. The test engine analyzes the compliance of a webpage element with accessibility rules in part by identifying the type of element. In the case of a carousel element a multi-prong testing approach can be used to assign a plurality of confidence scores to a webpage element, each confidence score, based on a likely characteristic of a candidate carousel element. A total combined confidence score exceeding a selected threshold can indicate the webpage element is a carousel. Upon identification, the test engine can apply carousel accessibility rules to the element.

18 Claims, 4 Drawing Sheets

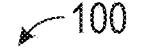
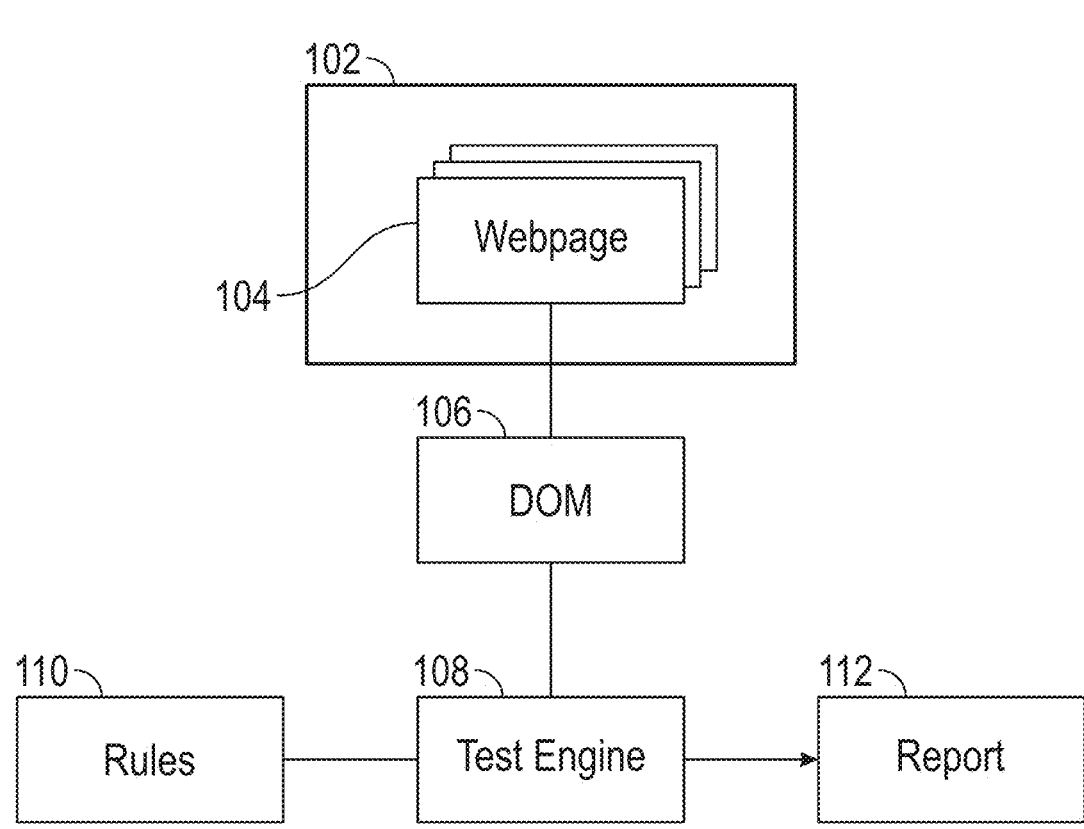
FIG. 1

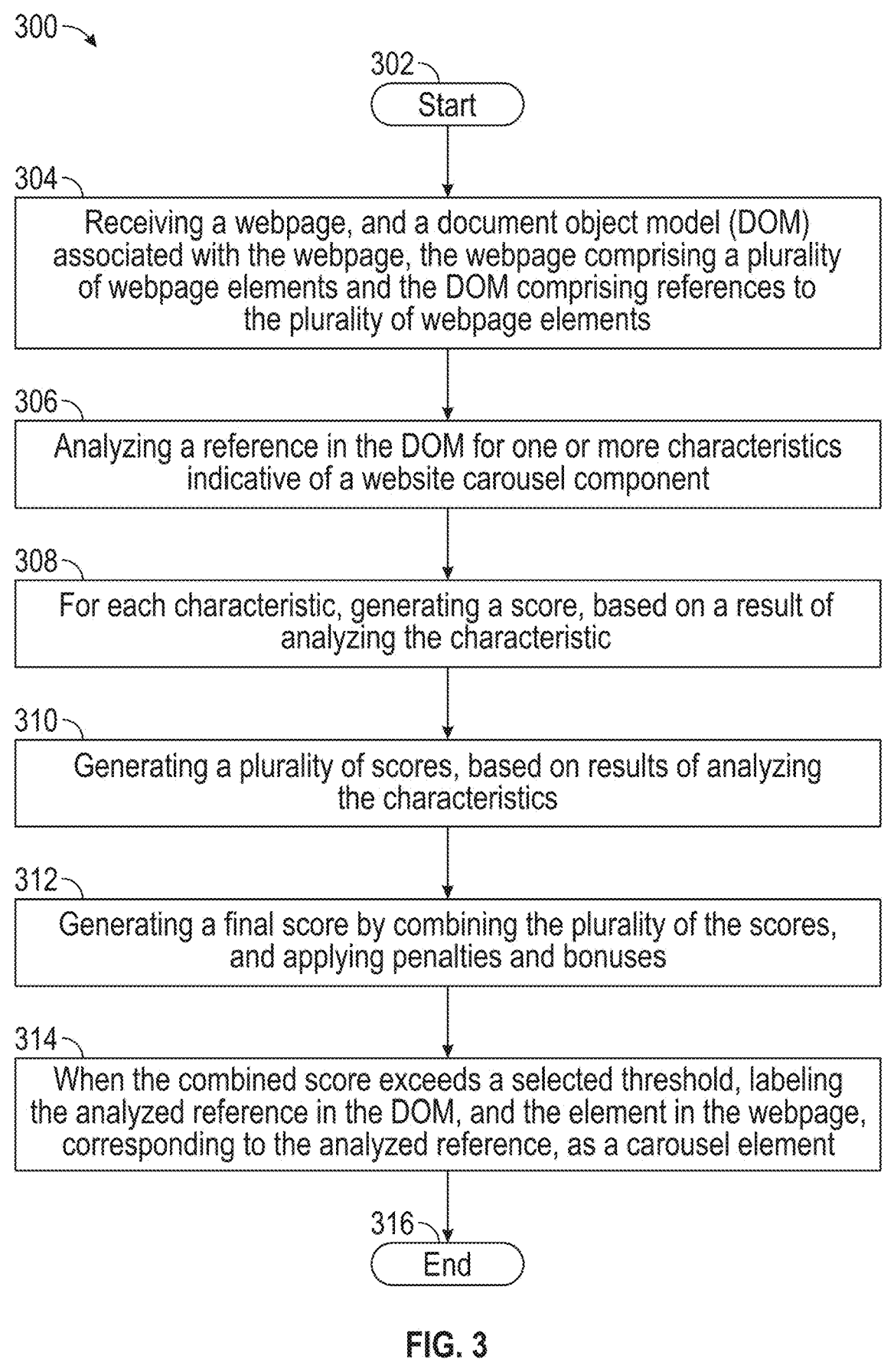

300

302
Start

304
Receiving a webpage, and a document object model (DOM) associated with the webpage, the webpage comprising a plurality of webpage elements and the DOM comprising references to the plurality of webpage elements 306
Analyzing a reference in the DOM for one or more characteristics indicative of a website carousel component 308
For each characteristic, generating a score, based on a result of analyzing the characteristic 310
Generating a plurality of scores, based on results of analyzing the characteristics 312
Generating a final score by combining the plurality of the scores, and applying penalties and bonuses 314
When the combined score exceeds a selected threshold, labeling the analyzed reference in the DOM, and the element in the webpage, corresponding to the analyzed reference, as a carousel element 316
End

FIG. 3

ROTATING USER INTERFACE ELEMENT DETECTION

BACKGROUND

Field

This invention relates generally to website development tools, and more particularly to tools directed to detecting webpage elements.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Software developers have a strong interest in making their products and services accessible to as many segments of population as possible. To that end, some developer teams dedicate their efforts to testing and debugging software accessibility issues. Some use tools that assess the compliance of software relative to a set of accessibility rules. Many of these tools rely on having to correctly identify the type and nature of the software element, particularly in the area of user interfaces, so they can correctly apply the relevant accessibility rules to the element and assess compliance. Beyond accessibility compliance development, correctly identifying software and webpage elements can be useful in software and/or webpage development lifecycle. Consequently, there is a need for systems and methods that can assist and automate in robustly identifying software elements and applying correct accessibility rules to those elements.

SUMMARY

The appended claims may serve as a summary of this application. Further areas of applicability of the present disclosure will become apparent from the detailed description, the claims, and the drawings. The detailed description and specific examples are intended for illustration only and are not intended to limit the scope of the disclosure.

BRIEF DESCRIPTION OF THE DRAWINGS

These drawings and the associated description herein are provided to illustrate specific embodiments of the invention and are not intended to be limiting.

FIG. 1 illustrates a block diagram of an environment of an accessibility test engine, deployed in relation to a website.

FIG. 3 also illustrates a flowchart of a method of detecting a carousel element according to an embodiment.

DETAILED DESCRIPTION

Figure 2:
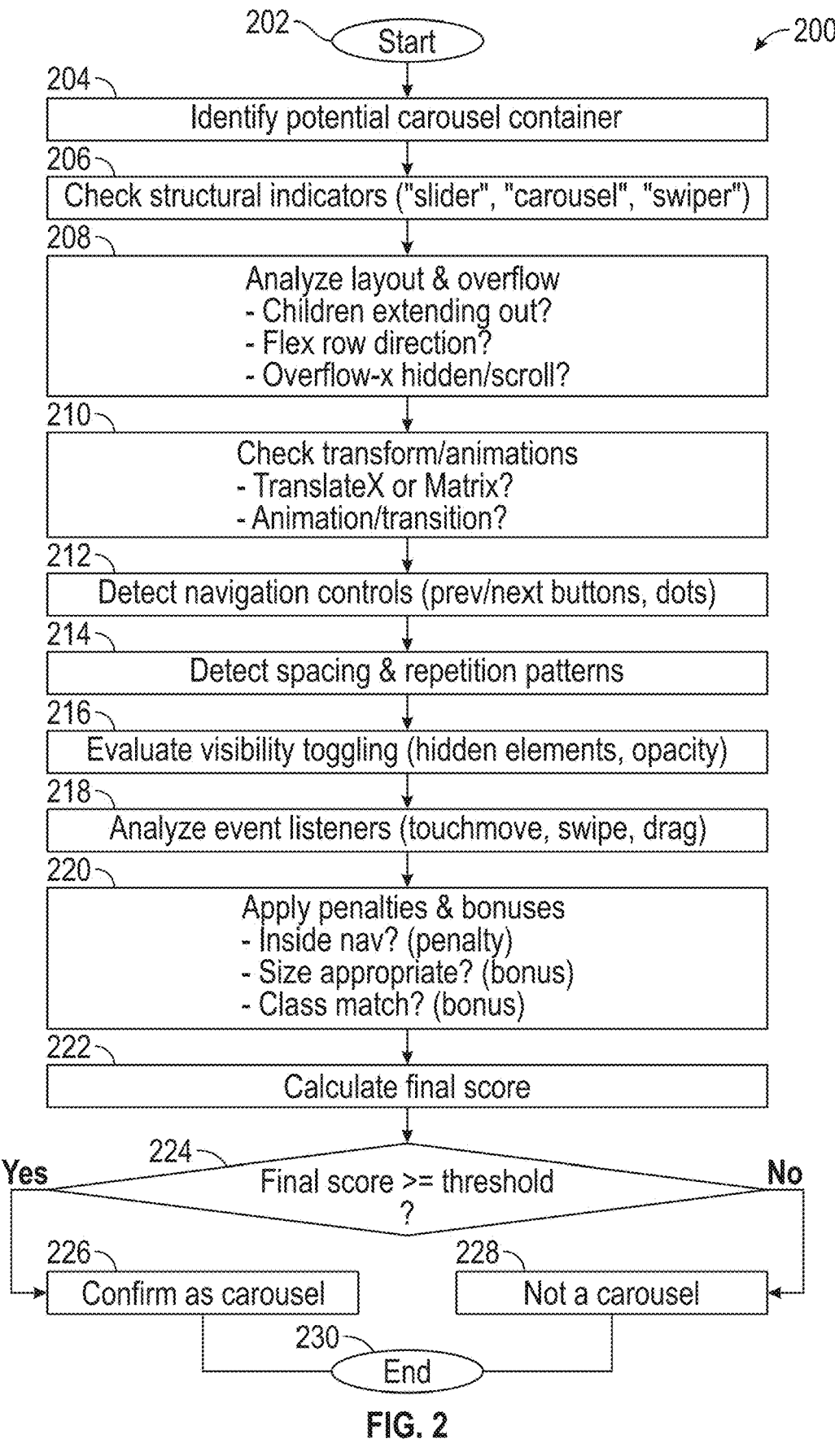
FIG. 2 illustrates a method of identifying a carousel element on a webpage, according to an embodiment.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements. Some of the embodiments or their aspects are illustrated in the drawings.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

A software development platform can include tools for testing and developing software with respect to accessibility features to make the software more accessible to all segments of the population. As such, the software development platform can include accessibility testing and accessibility test engines, which can accept software, for example, a webpage, as input, and generate an accessibility report. The report can include an identification of whether or not various elements of the software, for example in the user interface (UI) features, satisfy accessibility requirements. In some cases, accessibility requirements are directed to making the software compliant with screen readers and other accessibility technologies to enable accurate interfacing with accessibility technologies, such as screen readers and others. While embodiments are described in relation to their applicability to assess accessibility compliance and for their ability to provide an input to an accessibility test engine, they have applications beyond the accessibility field. For example, the described embodiments can be applicable to identifying a user interface element, such as a rotating or revolving user interface element of a webpage.

FIG. 1 illustrates a block diagram 100 of an environment of an accessibility test engine 108, deployed in relation to a website 102. The website 102 can include multiple webpages 104. Webpages 104 can have associated document object models (DOMs) 106. The Document Object Model (DOM) connects webpages to scripts or programming languages by representing the structure of a document—such as the hypertext markup language (HTML) representing a webpage—in memory. Usually it refers to JavaScript, even though modeling HTML, SVG, or XML documents as objects are not part of the core JavaScript language. The DOM represents a document with a logical tree. The test engine 108 can test a webpage for compliance with a set of rules 110, using the DOMs 106 of the webpages 104, and can generate a report 112 for the webpages 104 and/or the website 102. The rules 110 can be a set of accessibility compliance rules, or they can relate and correspond to another area in which a developer may use the environment 100 to perform testing on software. Similarly, the test engine 108 can be an accessibility test engine or a different test engine, depending on which rules 110 the test engine examines.

The operations of the test engine 108 is in part based on detecting what type of webpage element exists on a webpage 104. The type of element can indicate which rules from the set of rules 110, the test engine 108 should apply to a particular webpage element. An example of a webpage element is a rotating user interface component, such as a carousel. A carousel (also known as an image slider or content slider) on a website is a UI component that cycles through a series of images, text, or other content within a single space. It typically includes navigation controls like arrows, dots, or autoplay functionality.

Table (1) illustrates example rules 110 in relation to a carousel element.

TABLE (1)

| Rule ID | Description |
| --- | --- |
| SC 1.3.1 | Carousel is placed correctly in <section> |
| SC 1.3.2 | Order of focusable elements on the webpage should be correct |
| SC 1.4.1 | Content must reflow to fit a 320 pixel-wide viewport, without horizontal scrolling and 256 pixel high viewport |
| SC 4.1.2 | Custom-built elements in carousels should have appropriate roles |
| SC 2.2.2 | Auto playing content should have appropriate pause, stop, hide controls |

Misidentifying the type of webpage element can lead to applying incorrect rules and generating an incorrect report 112. Correctly identifying the type of webpage element can be challenging, as modem websites contain somewhat fewer standard elements and many sophisticated modem webpage elements are custom created by the developer, using the basic or standard webpage development elements from HTML, cascading style sheets (CSS), Java or other programming languages. As such there is sometimes not one particular test that can confidently identify a webpage element. For example, the carousel element in modern webpages is typically a rich element and custom-built, where each development team may use a unique approach to implementing a carousel, making it difficult to devise a single test that can confidently identify a carousel element. The described embodiments include applying a multi-prong analysis and performing multiple checks to arrive at a conclusion regarding whether a webpage element is a rotating user interface component, such as a carousel element.

FIG. 2 illustrates a method 200 of identifying a rotating user interface component, such as a carousel element on a webpage 104, according to an embodiment. The method 200 can operate on a DOM 106. The method starts at step 202, when a webpage and an associated DOM element is received. The DOM 106 can contain references, definitions and code related to the webpage elements. Step 204 includes identifying a potential carousel container. In some scenarios, custom-built carousels are built as container elements, having children elements. For example, a carousel element can include a display of various products, where each product is a child element in the carousel container. Step 206 includes checking for structural indicators of a carousel elements. Some carousel elements, despite being custom-built, still utilize some standard naming conventions, elements and/or libraries. For example, some class names, which can indicate a carousel element include slick-intialized, owl-carousel, swiper-initialized, and others. Structural elements indicative of a carousel element can also include HTML tags that are as a whole used for carousel elements, or include naming conventions that suggest a carousel element. An example HTML tag of the sort is RS-CAROUSEL-WRAP). Structural indicators can also include class names associated with carousel-related keywords. Examples include "slider," "carousel," "swiper," and others. Step 206 concludes by generating a structural indicator score, based on the result of analyzing the structural indicators characteristics of a reference in the DOM.

Step 208 includes analyzing the layout and overflow behavior of the container and/or the elements in the container. Step 208 analysis can include checking whether the child elements of the container are partially or fully outside the container's visible width (or viewport), a trait of sliding content, which can be indicative of a carousel. Step 208 can include checking that the container has a flexible display with flexibility in the row or horizontal direction, which can be an indication of a configuration for a carousel. Additionally, step 208 can include checking whether the horizontal overflow (e.g., overflow in the x direction) is hidden or scrollable, which often indicates a sliding mechanism. In other words, step 208 includes checking layout and overflow indicators of a carousel, including for example, the children element of a container extending outside of a viewport or visible area, display parameters indicating flexible row directions, and overflow instructions or parameters in the DOM (relating to references to the container under analysis in step 208) that children elements of the container have an overflow display in the horizontal direction, or have hidden elements, for example, the children element not visible in the viewport, and/or scrollable horizontal parameters. Step 208 additionally includes generating a layout and overflow score, based on result of analyzing the layout and overflow behavior and characteristics of the container reference in the DOM.

Step 210 includes checking the children element of a container reference in the DOM for transformations, transitions, and/or other animations, for example along the horizontal axis (x-axis), which can be indicative of a carousel element. Examples of transformations, transitions and/or animations characteristics of a carousel can include the DOM container reference having instructions, such as translateX, matrix, etc. Such instructions can be indicative of carousel movement effects. Furthermore, modern and sophisticated carousel container elements can contain animation instructions. For example, as a child element moves into a central portion of a viewport (the visible area of a carousel container element), the child elements to the left and right can become somewhat more faded in appearance, compared to the child element central in view. Another animation example includes smooth scrolling combined with fading as elements move in and out of view. Such animation and/or display transition instructions can be indicative of a carousel element. Step 210 further includes generating a transformation, transition, and/or animation (TTA) score, based on result of analyzing the TTA instructions of a DOM container reference element. In particular, TTA instructions modifying the display behavior of the container children elements along the horizontal axis can increase the TTA score.

Step 212 includes checking for presence of navigation controls, including DOM elements indicating navigations controls, such as "previous," and/or "next," buttons, arrows, central navigation dots (e.g., displayed in the center and below a carousel). Step 212 includes generating a navigation controls score, based on presence of navigation controls buttons inside or near a candidate container reference. In other words, for a candidate carousel container, the presence of navigation control buttons in selected locations such as arrows on the left and right sides of the display of the container can be indicative that the container is a carousel.

Step 214 includes detecting spacing and repetition patterns that can be indicative of a carousel. Modern carousels place the children elements horizontally, along the same line and spaced equally apart. Consequently, the presence of such spacing and repetition of a pattern of spacing can be indicative that the container element is likely a carousel. Step 214 includes calculating the gap between the children elements and checking for consistent spacing. Step 214 further includes generating a score or a confidence score, based on the result of detecting spacing and repetition patterns among the children elements of a container, indicating an even distribution in spacing of the children element.

Step 216 includes evaluating whether a DOM container reference element performs visibility toggling, by changing a visibility parameter and/or by modifying opacity of the display of the children element of the container. Modern carousel elements include more prominently displaying the children element in a carousel and displaying them less prominently or hiding them from view as the user explores through a carousel from left to right or vice versa. Such display behavior can be reflected in the DOM container reference element, within one or more display parameters. In other words, elements of a container can be inspected for determining whether the container and/or the children of the container perform visibility toggling and/or opacity modification. In some scenarios, these can be reflected in the HTML properties of the container and/or the children elements. For example, a container can be a carousel candidate when out of ten (10) children elements of the container, three (3) children have a visibility parameter set to TRUE, and seven (7) children have the visibility parameter set to FALSE. Alternatively, some children can have opacity set to "100%," making them invisible, while others have opacity set to "0%," making those elements highly visible. This scenario can also be an indication of a carousel element. Step 216 includes generating a confidence score, based on the result of evaluating the visibility toggling characteristic of a DOM container reference.

Step 218 includes detecting whether a candidate carousel container includes even listeners for handling user interactions, and whether those event listeners and associated triggered code are of a kind indicative of a potential carousel element. Modem carousels implement and accept user inputs and interactions with a sliding element. A carousel container or its children in modern carousels, likely implement event listeners, such as "touchmove," "mousedown," "drag," "swipe," and "pointerdown." These events can be termed carousel-indicating event listeners. They include event listeners directed to capturing user interactions with a carousel element.

The event listeners when triggered execute an associated code, depending on the received user interaction. At the same time, containers implementing only a simple user interaction (e.g., a single user interaction) may likely not be a carousel element, as modern, sophisticated carousel elements tend to implement richer user interactions (for example, each childe element is clickable). Furthermore, the presence of some event listeners can be a strong indicator that the element is not a carousel. For example, "play," "pause," "seek," can be an indication of a video playback container and not a carousel container. Step 218 further includes generating a confidence score, based on presence and type of event listeners implemented in a candidate container. For carousel-indicating event listeners, the confidence score is increase, and for single and non-carousel event listeners, the confidence score is reduced.

Step 220 includes applying penalties and bonuses to a combined confidence score. The combined confidence score can be generated by tallying the results of the scores generated in each of the steps 206-218. Step 220 can include detecting a context of a candidate carousel element and adjusting the combined confidence score accordingly. For example, if a candidate carousel element is inside a navigation bar, a menu, or a form or a footer, the combined confidence score can be adjusted negatively, as carousel elements are unlikely to be present inside those elements. For example, in some webpage implementations collapsible and dropdown elements can be implemented in a similar manner to carousels, insofar as the UI behavior of the elements (when some elements are rotatably visible and other elements are not) can be similar to that of carousels. However, collapsible, dropdown and other similar elements are not carousels and when they are detected in a candidate carousel element, the combined confidence score can be negatively adjusted to reduce the likelihood that even when they score well on other checks (steps 206-218), they still be labeled as carousels.

Step 220 further includes adjusting the combined confidence score, based on the size of the candidate element. For example, a candidate element can be too small or too large to be a carousel. A range of carousel sizes can be empirically determined by analyzing hundreds and thousands of websites, where the analysis outlines a range of sizes of carousel elements. Step 220 can include increasing or decreasing the combined confidence score, based on whether the size of a candidate element falls within the empirical range. Additional penalties and bonuses can also be applied. For example, if an element is built with classes and/or libraries that are typically used when building carousels, the element is likely a carousel and a corresponding bonus can be applied to the combined confidence score.

Step 222 includes calculating a final score, based on applying the penalties and bonuses to the combined confidence score. Step 224 includes comparing the final score with a selected threshold. If the final score is equal or greater than the selected threshold, the method moves to step 226 and the element is labeled as a carousel. If the final score is less than the selected threshold, the method moves to step 228 and the element is labeled as not a carousel. The method ends at step 230.

FIG. 3 illustrates a flowchart of a method 300 of detecting a carousel element according to an embodiment. The method starts at step 302. Step 304 includes receiving a webpage, and a document object model (DOM) associated with the webpage, the webpage can include a plurality of webpage elements and the DOM can include references to the plurality of the webpage elements. Step 306 includes selecting a candidate reference in the DOM and analyzing the selected reference in the DOM for one or more characteristics indicative of a website carousel element. Step 308 includes, for each characteristic, generating a confidence score, based on a result of analyzing the characteristic. Step 310 can include generating a plurality of confidence scores, based on the results of analyzing the characteristics. Steps 306, 308, 310 can be, in part or whole, accomplished by performing steps 206-218, as outlined in relation to the embodiment of FIG. 2. Step 312 includes generating a final score by combining the plurality of the scores, and applying penalties and bonuses, as outlined in relation to steps 220 and 222 of the embodiment of FIG. 2. Step 314 includes when the combined score exceeds a selected threshold, labeling the analyzed reference in the DOM, and the element in the webpage, corresponding to the analyzed reference, as a carousel element. The method ends at step 316.

Example Implementation Mechanism—Hardware Overview

Some embodiments are implemented by a computer system or a network of computer systems. A computer system may include a processor, a memory, and a non-transitory computer-readable medium. The memory and non-transitory medium may store instructions for performing methods, steps and techniques described herein.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

Figure 4:
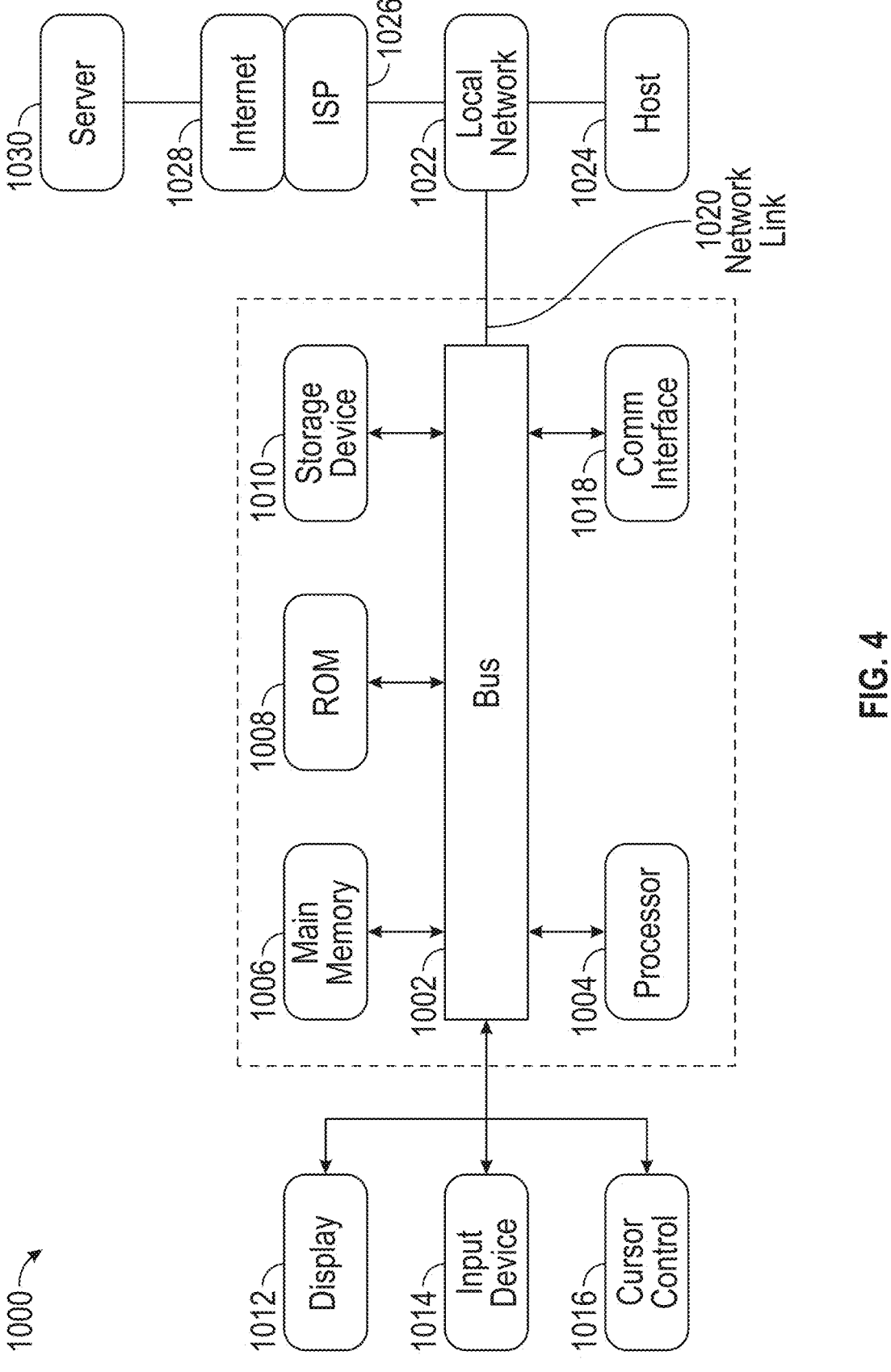
FIG. 4 illustrates an environment in which some embodiments may operate.

For example, FIG. 4 is a block diagram that illustrates a computer system 1000 upon which an embodiment of can be implemented. Computer system 1000 includes a bus 1002 or other communication mechanism for communicating information, and a hardware processor 1004 coupled with bus 1002 for processing information. Hardware processor 1004 may be, for example, special-purpose microprocessor optimized for handling audio and video streams generated, transmitted or received in video conferencing architectures.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid state disk is provided and coupled to bus 1002 for storing information and instructions.

Computer system 1000 may be coupled via bus 1002 to a display 1012, such as a cathode ray tube (CRT), liquid crystal display (LCD), organic light-emitting diode (OLED), or a touchscreen for displaying information to a computer user. An input device 1014, including alphanumeric and other keys (e.g., in a touch screen display) is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the user input device 1014 and/or the cursor control 1016 can be implemented in the display 1012 for example, via a touch-screen interface that serves as both output display and input device.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical, magnetic, and/or solid-state disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution.

EXAMPLES

It will be appreciated that the present disclosure may include any one and up to all of the following examples.

Example 1: A method comprising: receiving a webpage, and a document object model (DOM) associated with the webpage, the webpage comprising a plurality of webpage elements and the DOM comprising references to the plurality of webpage elements; analyzing a reference in the DOM for one or more characteristics indicative of a rotating user interface component; for each characteristic, generating a score, based on a result of analyzing the characteristic; generating a plurality of scores, based on results of analyzing the characteristics; combining the plurality of the scores; and when the combined score exceeds a selected threshold, labeling the analyzed reference in the DOM, and the element in the webpage, corresponding to the analyzed reference, as a rotating user interface component.

Example 2: The method of Example 1, further comprising detecting a container reference element in the DOM, wherein the container reference element comprises container children elements.

Example 3: The method of some or all of Examples 1 and 2, wherein analyzing a characteristic comprises checking structural indicators of a rotating user interface component, the structural indicators comprising usage of one or more of a class name, an HTML tag or a naming convention in the reference, suggestive of a rotating user interface component.

Example 4: The method of some or all of Examples 1-3, wherein analyzing a characteristic comprises checking layout and/or overflow parameters and/or behavior of a container reference in the DOM.

Example 5: The method of some or all of Examples 1-4, wherein analyzing a characteristic comprises checking presence of transformations, transitions and/or animations, along a horizontal axis for children elements of a DOM container reference.

Example 6: The method of some or all of Examples 1-5, wherein analyzing a characteristic comprises detecting navigation controls inside or near a DOM container reference element.

Example 7: The method of some or all of Examples 1-6, wherein analyzing a characteristic comprises detecting a spacing pattern comprising an even distribution of children elements of a DOM container element.

Example 8: The method of some or all of Examples 1-7, wherein analyzing a characteristic comprises detecting visibility toggling behavior by the DOM container reference element and/or the children of the DOM container reference element.

Example 9: The method of some or all of Examples 1-8, wherein analyzing a characteristic comprises detecting type of event listeners in a DOM container element.

Example 10: The method of some or all of Examples 1-9, further comprising applying penalties and bonuses to the combined score, wherein the penalties and bonuses are in part, based on one or more of the context of a DOM container reference element and the size of the DOM container reference element when generated as a user interface element.

Example 11: A non-transitory computer storage medium that stores executable program instructions that, when executed by one or more computing devices, configure the one or more computing devices to perform operations comprising: receiving a webpage, and a document object model (DOM) associated with the webpage, the webpage comprising a plurality of webpage elements and the DOM comprising references to the plurality of webpage elements; analyzing a reference in the DOM for one or more characteristics indicative of a rotating user interface component; for each characteristic, generating a score, based on a result of analyzing the characteristic; generating a plurality of scores, based on results of analyzing the characteristics; combining the plurality of the scores; and when the combined score exceeds a selected threshold, labeling the analyzed reference in the DOM, and the element in the webpage, corresponding to the analyzed reference, as a rotating user interface component.

Example 12: The non-transitory computer storage of Example 11, wherein the operations further comprise detecting a container reference element in the DOM, wherein the container reference element comprises container children elements.

Example 13: The non-transitory computer storage of some or all of Examples 11 and 12, wherein analyzing a characteristic comprises checking structural indicators of a rotating user interface component, the structural indicators comprising usage of one or more of a class name, an HTML tag or a naming convention in the reference, suggestive of a rotating user interface component.

Example 14: The non-transitory computer storage of some or all of Examples 11-13, wherein analyzing a characteristic comprises checking layout and/or overflow parameters and/or behavior of a container reference in the DOM.

Example 15: The non-transitory computer storage of some or all of Examples 11-14, wherein analyzing a characteristic comprises checking presence of transformations, transitions and/or animations, along a horizontal axis for children elements of a DOM container reference.

Example 16: The non-transitory computer storage of some or all of Examples 11-15, wherein analyzing a characteristic comprises detecting navigation controls inside or near a DOM container reference element.

Example 17: The non-transitory computer storage of some or all of Examples 11-16, wherein analyzing a characteristic comprises detecting a spacing pattern comprising an even distribution of children elements of a DOM container element.

Example 18: The non-transitory computer storage of some or all of Examples 11-17, wherein analyzing a characteristic comprises detecting visibility toggling behavior by the DOM container reference element and/or the children of the DOM container reference element.

Example 19: The non-transitory computer storage of some or all of Examples 11-18, wherein analyzing a characteristic comprises detecting type of event listeners in a DOM container element.

Example 20: The non-transitory computer storage of some or all of Examples 11-19, wherein the operations further comprise applying penalties and bonuses to the combined score, wherein the penalties and bonuses are in part, based on one or more of the context of a DOM container reference element and the size of the DOM container reference element when generated as a user interface element.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including, hard drives, floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects.

What is claimed is:

1. A method comprising:

receiving a webpage, and a document object model (DOM) associated with the webpage, the webpage comprising a plurality of webpage elements and the DOM comprising references to the plurality of webpage elements;

analyzing a reference in the DOM for one or more characteristics indicative of a rotating user interface component;

for each characteristic, generating a score, based on a result of analyzing the characteristic;

generating a plurality of scores, based on results of analyzing the characteristics;

combining the plurality of the scores;

when the combined score exceeds a selected threshold, labeling the analyzed reference in the DOM, and the element in the webpage, corresponding to the analyzed reference, as a rotating user interface component; and applying penalties and bonuses to the combined score, wherein the penalties and bonuses are in part, based on one or more of the context of a DOM container reference element and the size of the DOM container reference element when generated as a user interface element.

2. The method of claim 1, further comprising detecting a container reference element in the DOM, wherein the container reference element comprises container children elements.

3. The method of claim 1, wherein analyzing a characteristic comprises checking structural indicators of a rotating user interface component, the structural indicators comprising usage of one or more of a class name, an HTML tag or a naming convention in the reference, suggestive of a rotating user interface component.

4. The method of claim 1, wherein analyzing a characteristic comprises checking layout and/or overflow parameters and/or behavior of a container reference in the DOM.

5. The method of claim 1, wherein analyzing a characteristic comprises checking presence of transformations, transitions and/or animations, along a horizontal axis for children elements of a DOM container reference.

6. The method of claim 1, wherein analyzing a characteristic comprises detecting navigation controls inside or near a DOM container reference element.

7. The method of claim 1, wherein analyzing a characteristic comprises detecting a spacing pattern comprising an even distribution of children elements of a DOM container element.

8. The method of claim 1, wherein analyzing a characteristic comprises detecting visibility toggling behavior by the DOM container reference element and/or the children of the DOM container reference element.

9. The method of claim 1, wherein analyzing a characteristic comprises detecting type of event listeners in a DOM container element.

10. A non-transitory computer storage medium that stores executable program instructions that, when executed by one or more computing devices, configure the one or more computing devices to perform operations comprising:

receiving a webpage, and a document object model (DOM) associated with the webpage, the webpage comprising a plurality of webpage elements and the DOM comprising references to the plurality of webpage elements;

analyzing a reference in the DOM for one or more characteristics indicative of a rotating user interface component;

for each characteristic, generating a score, based on a result of analyzing the characteristic;

generating a plurality of scores, based on results of analyzing the characteristics;

combining the plurality of the scores;

when the combined score exceeds a selected threshold, labeling the analyzed reference in the DOM, and the element in the webpage, corresponding to the analyzed reference, as a rotating user interface component, applying penalties and bonuses to the combined score, wherein the penalties and bonuses are in part, based on one or more of the context of a DOM container reference element and the size of the DOM container reference element when generated as a user interface element.

11. The non-transitory computer storage of claim 10, wherein the operations further comprise detecting a container reference element in the DOM, wherein the container reference element comprises container children elements.

12. The non-transitory computer storage of claim 10, wherein analyzing a characteristic comprises checking structural indicators of a rotating user interface component, the structural indicators comprising usage of one or more of a class name, an HTML tag or a naming convention in the reference, suggestive of a rotating user interface component.

13. The non-transitory computer storage of claim 10, wherein analyzing a characteristic comprises checking layout and/or overflow parameters and/or behavior of a container reference in the DOM.

14. The non-transitory computer storage of claim 10, wherein analyzing a characteristic comprises checking presence of transformations, transitions and/or animations, along a horizontal axis for children elements of a DOM container reference.

15. The non-transitory computer storage of claim 10, wherein analyzing a characteristic comprises detecting navigation controls inside or near a DOM container reference element.

16. The non-transitory computer storage of claim 10, wherein analyzing a characteristic comprises detecting a spacing pattern comprising an even distribution of children elements of a DOM container element.

17. The non-transitory computer storage of claim 10, wherein analyzing a characteristic comprises detecting visibility toggling behavior by the DOM container reference element and/or the children of the DOM container reference element.

18. The non-transitory computer storage of claim 10, wherein analyzing a characteristic comprises detecting type of event listeners in a DOM container element.

* * * * *